US009238984B2

(12) United States Patent
Chavannavar

(10) Patent No.: US 9,238,984 B2
(45) Date of Patent: Jan. 19, 2016

(54) EXHAUST EMISSION PREDICTION SYSTEM AND METHOD

(71) Applicant: CATERPILLAR INC., Peoria, IL (US)

(72) Inventor: Praveen Shivshankar Chavannavar, Dunlap, IL (US)

(73) Assignee: Caterpillar, Inc., Peoria, IL (US)

( * ) Notice: Subject to any disclaimer, the term of this patent is extended or adjusted under 35 U.S.C. 154(b) by 32 days.

(21) Appl. No.: 14/171,637

(22) Filed: Feb. 3, 2014

(65) Prior Publication Data

US 2015/0218991 A1 Aug. 6, 2015

(51) Int. Cl.
*F01N 3/00* (2006.01)
*F01N 3/20* (2006.01)

(52) U.S. Cl.
CPC ...................................... *F01N 3/208* (2013.01)

(58) Field of Classification Search
USPC ............ 60/274, 276, 286, 385, 297, 301, 303
See application file for complete search history.

(56) References Cited

U.S. PATENT DOCUMENTS

| 6,546,720 | B2 | 4/2003 | van Nieuwstadt |
| 6,755,014 | B2* | 6/2004 | Kawai et al. ...................... 60/286 |
| 7,134,273 | B2 | 11/2006 | Mazur et al. |
| 7,418,816 | B2* | 9/2008 | Upadhyay et al. .............. 60/285 |
| 7,603,846 | B2 | 10/2009 | Lueders et al. |
| 7,707,824 | B2 | 5/2010 | Solbrig |
| 7,736,595 | B2 | 6/2010 | Gady et al. |
| 7,824,636 | B1 | 11/2010 | Kraemer et al. |
| 7,832,200 | B2 | 11/2010 | Kesse et al. |
| 7,858,060 | B2 | 12/2010 | Gady et al. |
| 8,034,291 | B2 | 10/2011 | Qi et al. |
| 8,176,729 | B2 | 5/2012 | Ren |
| 8,209,963 | B2 | 7/2012 | Kesse et al. |
| 8,240,194 | B2 | 8/2012 | Dobson et al. |
| 8,250,913 | B2 | 8/2012 | Lee et al. |
| 8,256,208 | B2* | 9/2012 | Wills et al. ...................... 60/286 |
| 8,375,700 | B2 | 2/2013 | Sisken et al. |
| 8,474,248 | B2 | 7/2013 | Sun et al. |
| 8,623,305 | B2* | 1/2014 | Yacoub et al. ............. 423/213.2 |

(Continued)

FOREIGN PATENT DOCUMENTS

WO   WO 2012/151442 A1   11/2012

OTHER PUBLICATIONS

Chavannavar, P., et al., "Genetic Algorithm based Automated Calibration Tool for Numerical Selective Catalyitic Reduction (SCR) Models," SAE International Journal of Fuels and Lubricants, SAE Int. J. Fuels Lubr. 2(1):568-577, 2009.

*Primary Examiner* — Binh Q Tran
(74) *Attorney, Agent, or Firm* — Finnegan, Henderson, Farabow, Garrett & Dunner, LLP

(57) ABSTRACT

An exhaust emissions prediction system includes a catalytic device configured to receive a flow of exhaust and a downstream NOx sensor located downstream of the catalytic device. The downstream NOx sensor is sensitive to NOx and ammonia, and is configured to generate a measured value. The system also includes a controller connected to the downstream NOx sensor. The controller is configured to determine a predicted value for the downstream NOx sensor, determine a mass flow rate of the flow of exhaust into the catalytic device, adjust the mass flow rate based on the predicted value and the measured value, and determine at least one emissions characteristic downstream of the catalytic device using the adjusted mass flow rate.

20 Claims, 3 Drawing Sheets

(56) References Cited

U.S. PATENT DOCUMENTS

| | | | |
|---|---|---|---|
| 8,640,448 B2 * | 2/2014 | Geveci et al. | 60/301 |
| 8,789,358 B2 * | 7/2014 | Vosz | 60/286 |
| 2010/0050614 A1 | 3/2010 | Parmentier et al. | |
| 2011/0138779 A1 | 6/2011 | Neumayer | |
| 2011/0314793 A1 | 12/2011 | Mullins et al. | |
| 2013/0098462 A1 | 4/2013 | Hoskin | |
| 2013/0115152 A1 | 5/2013 | Nordberg et al. | |
| 2013/0152545 A1 | 6/2013 | Chavannavar | |

* cited by examiner

EXHAUST EMISSION PREDICTION SYSTEM AND METHOD

TECHNICAL FIELD

The present disclosure relates generally to an exhaust system, and more particularly, to an exhaust emission prediction system and method.

BACKGROUND

Internal combustion engines, including diesel engines, gasoline engines, gaseous fuel-powered engines, and other engines known in the art, may exhaust a complex mixture of emissions. The exhaust emissions may be composed of gaseous and solid compounds, including particulate matter, nitrogen oxides (NOx), and sulfur compounds. Due to heightened environmental concerns, exhaust emission standards have become increasingly stringent. The amount of exhaust emissions from an engine may be regulated depending on the type, size, and/or class of the engine.

One method that has been implemented by engine manufacturers to comply with the regulation of NOx exhausted to the environment has been to implement a strategy called selective catalytic reduction (SCR). SCR is a process by which gaseous or liquid reductant (e.g., a mixture of urea and water) is injected into the flow of exhaust from the engine. The combined flow may form ammonia ($NH_3$) which may then be absorbed onto an SCR catalyst. The ammonia may react with NOx in the flow of exhaust to form $H_2O$ and $N_2$, thereby reducing the amount of NOx in the flow of exhaust.

The ability of the SCR catalyst to reduce NOx depends upon many factors, such as catalyst formulation, the size of the SCR catalyst, exhaust gas temperature, and urea dosing rate. With regard to the dosing rate, the NOx reduction efficiency tends to increase linearly until the dosing rate reaches a certain limit. Above the limit, the NOx reduction efficiency may increase at a slower rate because the ammonia may be supplied at a faster rate than the NOx reduction process can consume. The excess ammonia, known as ammonia slip, may be expelled from the SCR catalyst.

It may be useful to monitor the emissions, such as the NOx and ammonia, discharged from the SCR catalyst. One method of estimating NOx and ammonia downstream of the SCR catalyst is described in U.S. Pat. No. 7,858,060 (the '060 patent) issued to Gady et al. The '060 patent describes a dosing control module for controlling a mass flow rate of a dosing agent for an SCR catalyst. The dosing control module includes an SCR analysis module that estimates NOx and ammonia downstream of the SCR catalyst. Inputs to the dosing control module include signals from NOx sensors that are cross-sensitive to ammonia and that are located upstream and downstream of the SCR catalyst.

Although the system of the '060 patent may estimate NOx and ammonia downstream of the SCR catalyst, the estimates may not be accurate. For example, because the NOx sensors are sensitive to both NOx and ammonia, the system may not process the signals from the NOx sensors effectively to produce reliable information for determining the estimates for NOx and ammonia, and therefore, may provide inaccurate estimations.

The disclosed system is directed to overcoming one or more of the problems set forth above.

SUMMARY

In one aspect, the present disclosure is directed to an exhaust emissions prediction system. The system includes a catalytic device configured to receive a flow of exhaust and a downstream NOx sensor located downstream of the catalytic device. The downstream NOx sensor is sensitive to NOx and ammonia, and is configured to generate a measured value. The system also includes a controller connected to the downstream NOx sensor. The controller is configured to determine a predicted value for the downstream NOx sensor, determine a mass flow rate of the flow of exhaust into the catalytic device, adjust the mass flow rate based on the predicted value and the measured value, and determine at least one emissions characteristic downstream of the catalytic device using the adjusted mass flow rate.

In another aspect, the present disclosure is directed to a method of predicting an emissions characteristic in a flow of exhaust from an engine using a controller. The method includes using a downstream NOx sensor located downstream of a catalytic device to determine a measured value indicative of a concentration of NOx and ammonia in the flow of exhaust generated by the engine. The method also includes determining, using the controller, a predicted value for the concentration of NOx and ammonia in the flow of exhaust detected by the downstream NOx sensor, and determining, using the controller, a mass flow rate of the flow of exhaust into the catalytic device. The method further includes adjusting, using the controller, the mass flow rate based on the predicted value and the measured value, and determining, using the controller, at least one emissions characteristic downstream of the catalytic device using the adjusted mass flow rate.

In another aspect the present disclosure is directed to engine system including an engine configured to generate a flow of exhaust, an injector configured to inject reductant into the flow of exhaust, and a catalytic device configured to receive the flow of exhaust after being injected with the reductant. The engine system also includes an upstream NOx sensor located upstream of the catalytic device and being configured to output a measured value. The engine system also includes a downstream NOx sensor located downstream of the catalytic device, and the downstream NOx sensor is sensitive to NOx and ammonia. The downstream NOx sensor is configured to output a measured value. The engine system further includes a processor, and a memory module configured to store instructions that, when executed, enable the processor to determine a predicted value for the downstream NOx sensor. The instructions also enable the processor to determine a correction factor based on a first conversion efficiency of the catalytic device determined using the measured values output from the upstream and downstream NOx sensors and a second conversion efficiency of the catalytic device determined using the predicted value. The instructions further enable the processor to determine at least one emissions characteristic downstream of the catalytic device using the correction factor.

DETAILED DESCRIPTION

Reference will now be made in detail to exemplary embodiments, which are illustrated in the accompanying drawings. Wherever possible, the same reference numbers will be used throughout the drawings to refer to the same or like parts.

Figure 1:
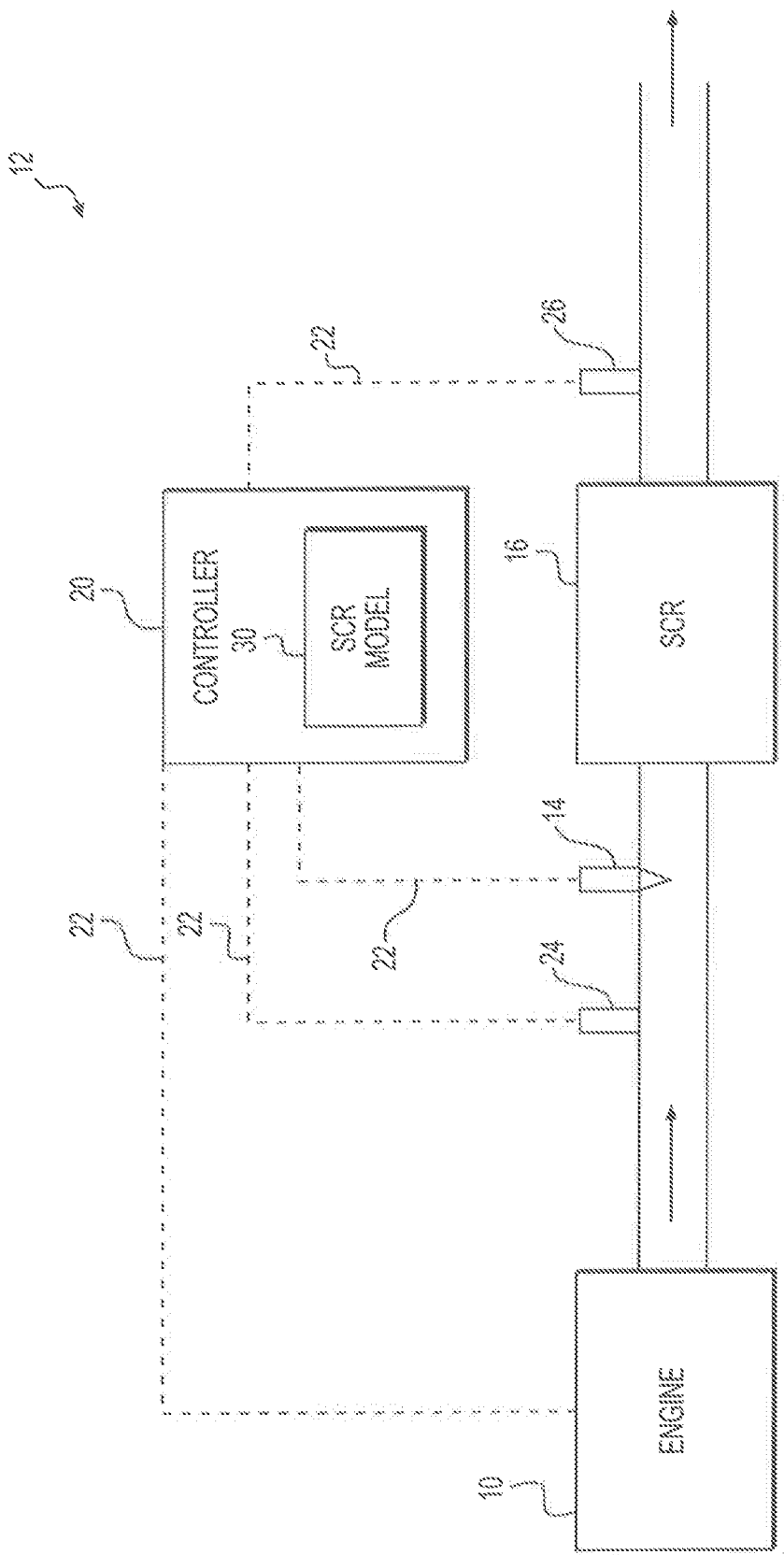
FIG. 1 is a diagrammatic illustration of an engine and an exhaust emissions prediction system, according to an embodiment.

FIG. 1 is a diagrammatic illustration of a power source, such as an engine 10, of a machine and an exhaust emissions prediction system, according to an embodiment. The disclosed embodiment may be applicable to various types of machines such as, for example, a fixed or mobile machine that performs some type of operation associated with an industry such as mining, construction, farming, transportation, power generation, tree harvesting, forestry, or any other industry known in the art. The engine 10 may be an internal combustion engine, such as, for example, a diesel engine, a gasoline engine, a gaseous fuel-powered engine, or any other engine apparent to one skilled in the art. The engine 10 may alternatively be another source of power such as a furnace or any other suitable source of power for a powered system such as a factory or power plant. Operation of the engine 10 may produce power and a flow of exhaust. For example, each combustion chamber (not shown) of the engine 10 may mix fuel with air and combust the mixture therein to produce the flow of exhaust. The flow of exhaust may contain carbon monoxide, NOx, carbon dioxide, aldehydes, soot, oxygen, nitrogen, water vapor, and/or hydrocarbons.

An exhaust system 12 is provided with the engine 10 such that the flow of exhaust may be fluidly communicated from the engine 10 to the exhaust system 12. The flow of exhaust produced by the engine 10 may be directed from the engine 10 to components of the exhaust system 12 by flow lines. For example, as shown in FIG. 1, the flow lines may include pipes, tubing, conduits, and/or other exhaust-carrying structures known in the art through which the flow of exhaust may be directed to an injector 14 disposed upstream from a catalytic device, such as an SCR catalyst 16, in the exhaust system 12. Although not shown, other components such as, for example, one or more turbochargers or any other component known in the art for treating or handling exhaust may be disposed between the exhaust passageway of the engine 10 and the inlet of the exhaust system 12.

The injector 14 may be connected to a reductant supply (not shown) and may inject reductant, such as urea, urea and water, ammonia, and/or other elements or compounds capable of chemically reducing compounds, e.g., NOx, contained within the now of exhaust in the presence of for example, catalyst materials. The injector 14 may include a nozzle (not shown) or other flow control device configured to assist in controllably releasing a flow of reductant into the flow of exhaust from the engine 10. The nozzle may be any type of injector known in the art and may include any device capable of injecting and/or atomizing an injected fluid.

The SCR catalyst 16 may chemically reduce the amount of NOx in the flow of exhaust. Reductant injected into the flow of exhaust by the injector 14 upstream from the SCR catalyst 16 may be absorbed onto the SCR catalyst 16 so that the reductant may react with NOx in the flow of exhaust to form $H_2O$ (water vapor) and $N_2$ (nitrogen gas). For example, a mixture of urea and water injected by the injector 14 may decompose to ammonia, and the SCR catalyst 16 may facilitate a reaction between the ammonia and NOx in the flow of exhaust to produce water and nitrogen gas, thereby removing NOx from the flow of exhaust. The SCR catalyst 16 may include catalyst materials such as, but not limited to, zeolite (e.g., iron zeolite or copper zeolite) or vanadia. After exiting the SCR catalyst 16, the flow of exhaust may be output from the exhaust system 12, e.g., released into the surrounding atmosphere, such as through a tail pipe.

In addition to the SCR catalyst 16, the exhaust system 12 may include one or more other aftertreatment devices configured to remove particulates and other emissions from the flow of exhaust, e.g., a filter for capturing particulates, ash, or other materials from the exhaust gas to prevent their discharge into the surrounding environment, such as a diesel particulate filter (DPF), a system for regenerating the filter by removing the particulate matter trapped by the filter, other catalytic devices, and/or other exhaust gas treatment devices. For example, a diesel oxidation catalyst (DOC) may be located upstream of the injector 14 and may raise the $NO_2/NOx$ ratio, which may improve the NOx conversion efficiency of the SCR catalyst 16. An ammonia oxidation (AMOX) catalyst may be located downstream of the SCR catalyst 16 and may oxidize ammonia that slips from the SCR catalyst 16 to form $N_2$ and $H_2O$.

The exhaust emissions prediction system may include a controller 20 connected via communication lines 22 to one or more of the components of the engine 10 and the exhaust system 12. For example, the controller 20 may receive input via communication lines 22 from a variety of sources including, for example, a timer and/or one or more sensors configured to measure temperature, speed, pressure, fuel quantity consumed, flow rate, amount of reductant injected, and/or other operating characteristics of the engine 10 and/or exhaust system 12. As shown in FIG. 1, the controller 20 may be connected by the communication lines 22 to an upstream NOx sensor 24 and a downstream NOx sensor 26. The upstream NOx sensor 24 may be located downstream of the engine 10, and upstream of the injector 14 and the SCR catalyst 16. The upstream NOx sensor 24 may also be located downstream from the turbocharger (if included) and/or upstream from the DOC (if included). Alternatively, the upstream NOx sensor 24 may be located at or near the outlet of the engine 10. The downstream NOx sensor 24 may be located downstream of the SCR catalyst 16, e.g., at or near the outlet of the SCR catalyst 16 and/or at or near the tail pine (if included). The downstream NOx sensor 24 may also be located upstream or downstream of the AMOX catalyst (if included). Both of the NOx sensors 24, 26 may be physical (hardware) sensors that are cross sensitive to ammonia so that each NOx sensor 24, 26 is configured to generate a measured value that is indicative of a combination of NOx and ammonia concentrations at the location of the respective NOx sensor 24, 26.

The controller 20 may include components required to run an application such as, for example, a memory module, a secondary storage device, and a processor or microprocessor, such as a central processing unit, as known in the art. The memory module may be configured to store information used by the processor, e.g., computer programs or code used by the processor to enable the processor to perform functions consistent with disclosed embodiments, e.g., the processes described in detail below. The controller 20 may be communicatively coupled with one or more components of the engine 10 and/or the exhaust system 12 to change the operation thereof. Optionally, the controller 20 may be integrated into the engine 10, e.g., as part of art engine control module (ECM). The controller 20 may use the inputs to form a control signal based on a pre-set control algorithm. The control signal may be transmitted from the controller 20 via the communication lines 22 to various actuation devices, such as one or more components of the engine 10 and/or the exhaust system 12, e.g., the injector 14 to control the timing and amount of injections.

The controller 20 may employ a model 30, such as a physics-based SCR model, that is based on one or more physical and/or chemical equations to estimate the performance (e.g., emissions characteristics) and other operating characteristics of the SCR catalyst 16. For example, the model 30 may include the following Equations (1)-(6) representing the reactions occurring at the SCR catalyst 16:

$$NH_3 + S \rightarrow NH_3^* \tag{1}$$

$$NH_3^* \rightarrow NH_3 + S \tag{2}$$

$$4NH_3^* + 4NO + O_2 \rightarrow 4N_2 + 6H_2O \tag{3}$$

$$2NH_3^* + NO + NO_2 \rightarrow 2N_2 + 3H_2O \tag{4}$$

$$4NH_3^* + 3NO_2 \rightarrow 3.5N_2 + 6H_2O \tag{5}$$

$$4NH_3^* + 3O_2 \rightarrow 2N_2 + 6H_2O \tag{6}$$

Specifically, Equations (1) and (2) represent the adsorption and desorption of ammonia on the SCR catalyst 16, respectively. Equations (3) and (4) represent the standard and fast NOx reduction reactions in the SCR catalyst 16, respectively. Equation (5) represents the reduction reaction of $NO_2$ on the SCR catalyst 16, and Equation (6) represents the oxidation of ammonia on the SCR catalyst 16. The model 30 may also include other equations representing other reactions occurring at the SCR catalyst 16.

Figure 2:
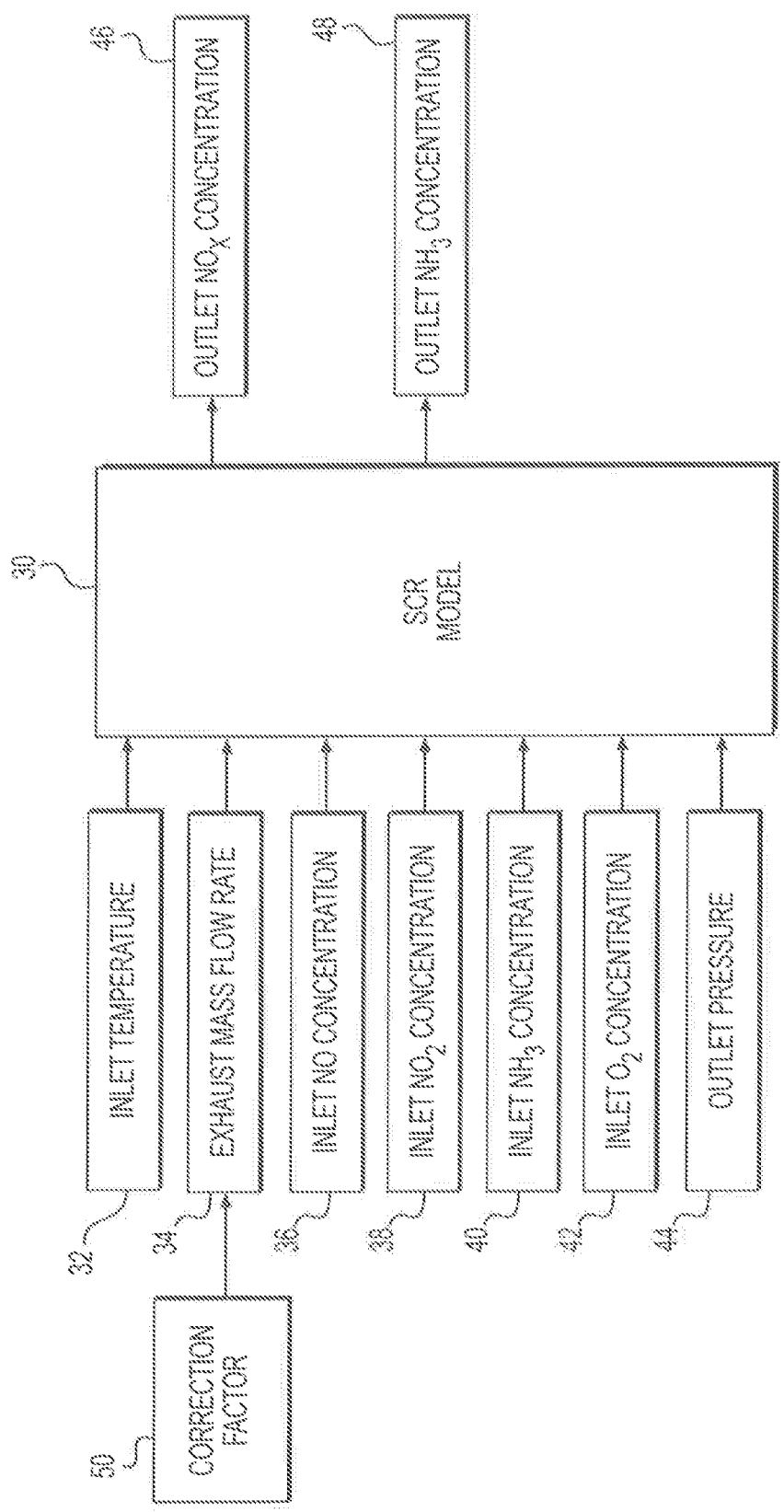
FIG. 2 is a diagrammatic illustration of an SCR model for the exhaust emissions prediction system of FIG. 1.

FIG. 2 shows a diagrammatic illustration of the model 30, according to an embodiment. The model 30 may be used to estimate or predict one or more operating characteristics of the SCR catalyst 16 based on one or more inputs. As shown in FIG. 2, the inputs may include an inlet temperature 32 of the flow of exhaust entering the SCR catalyst 16, an exhaust mass flow rate 34 entering the SCR catalyst 16, an inlet NO concentration 36 of the flow of exhaust entering the SCR catalyst 16, an inlet $NO_2$ concentration 38 of the flow of exhaust entering the SCR catalyst 16, an inlet ammonia concentration 40 of the flow of exhaust entering the SCR catalyst 16, an inlet $O_2$ concentration 42 of the flow of exhaust entering the SCR catalyst 16, and/or an outlet pressure 44 of the flow of exhaust exiting the SCR catalyst 16.

The inputs may be estimated (e.g., using the controller 20 and/or virtual sensors) or measured (e.g., using physical sensors), as known in the art. For example, the inlet temperature 32 may be measured using a temperature sensor located upstream of the SCR catalyst 16, e.g., at or near the inlet of the SCR catalyst 16 and/or downstream from the DPF (if included). The exhaust mass flow rate 34 may be determined by the controller 20 based on one or more engine operating conditions, such as engine speed. The inlet NO and $NO_2$ concentrations 36, 38 may be determined by the controller 20 based on the measured value from the upstream NOx sensor 24 in addition to other parameters, such as the inlet temperature 32 and the exhaust mass flow rate 34. The inlet ammonia concentration 40 may be determined by the controller 20 based on the amount of reductant that is dosed into the flow of exhaust, e.g., based on the command signal to the injector 14. The inlet $O_2$ concentration 42 may be determined by the controller 20 based on an estimated or measured amount of air intake into the engine 10. The outlet pressure 44 may be measured using a pressure sensor located downstream of the SCR catalyst 16, e.g., at or near the outlet of the SCR catalyst 16. For embodiments that include other exhaust treatment components (e.g., a DOC) upstream of the SCR catalyst 16, the controller 20 may be configured to estimate the inputs by taking into account the effect of the other exhaust treatment components on the composition of the flow of exhaust upstream of the SCR catalyst 16.

As shown in FIG. 2, the operating characteristics estimated by the model 30 may include one or more emissions characteristics, such as an outlet NOx concentration 46 (e.g., the combined concentration of NO and $NO_2$) of the flow of exhaust exiting the SCR catalyst 16 and/or an outlet ammonia concentration 48 of the flow of exhaust exiting the SCR catalyst 16. The model 30 may estimate the operating characteristics using Equations (1)-(6) and the inputs described above. Providing estimates for these emissions characteristics may be useful in determining the effectiveness of the SCR catalyst 16. Also, the controller 20 may be configured to use the estimates as feedback for controlling the dosing of reductant using the injector 14. For embodiments that include other exhaust treatment components (e.g., an AMOX catalyst) downstream of the SCR catalyst 16, the controller 20 may be configured to estimate the operating characteristics by also taking into account the effect of the other exhaust treatment components on the composition of the flow of exhaust downstream of the SCR catalyst 16.

Because the downstream NOx sensor 26 is sensitive to both NOx and ammonia, the exhaust emissions prediction system may also take into account this cross-sensitivity in order to provide reliable and accurate estimates for the operating characteristics of the SCR catalyst 16. For example, the model 30 may determine a predicted value for the output from the downstream NOx sensor 26. If the predicted value is greater than the measured value, then the predictions of the outlet NOx and ammonia concentrations 46, 48 by the model 30 may be too high, which may indicate that the kinetics of the SCR catalyst 16 in the model 30 (the rates of the reactions represented using Equations (1)-(6) are too slow. Since changing the kinetics in the model 30 may be difficult, the controller 20 may instead adjust one or more of the inputs to the model 30 to produce the same effect as changing the kinetics of the SCR catalyst 16 so that the model 30 may provide more accurate estimates for the operating characteristics. For example, in the embodiment shown in FIG. 2, the controller 20 may decrease the exhaust mass flow rate 34 to approximate the speeding up of the kinetics of the SCR catalyst 16. Specifically, the controller 20 may determine a correction factor 50 that may be used to adjust the exhaust mass flow rate 34 as described in more detail below.

On the other hand, if the predicted value is less than the measured value, then the predictions of the outlet NOx and ammonia concentrations 46, 48 by the model 30 may be too low, which may indicate that the kinetics of the SCR catalyst 16 in the model 30 are too fast. The controller 20 may adjust the model 30 to slow down the kinetics of the SCR catalyst 16, e.g., by increasing the exhaust mass flow rate 34 using the correction factor 50. Thus, the controller 20 may adjust the exhaust mass flow rate 34 that is input into the model 30 using the correction factor 50 to adjust the kinetics of the SCR catalyst 16 represented in the model 30.

If the predicted value is approximately equal to the measured value, then the predictions of the outlet NOx and ammonia concentrations 46, 48 may be acceptable. Thus, the controller 20 may not change the exhaust mass flow rate 34. Because the model 30 may be governed by Equations (1)-(6), which fix the relative quantities of the outlet NOx and ammonia concentrations 46, 48, the estimated values of the outlet NOx and ammonia concentrations 46, 48 may both be acceptable or not acceptable. The outlet NOx concentration 46 cannot be acceptable while the outlet ammonia concentration 48 is too low, or vice versa. Also, the outlet NOx concentration 46 cannot be too high while the outlet ammonia concentration 48 is too low, or vice versa.

INDUSTRIAL APPLICABILITY

The disclosed exhaust emissions prediction system may be applicable to any exhaust system. The exhaust emissions prediction system may use the NOx sensors 24, 26 to adjust the model 30 to provide more accurate predictions for the emissions characteristics.

Figure 3:
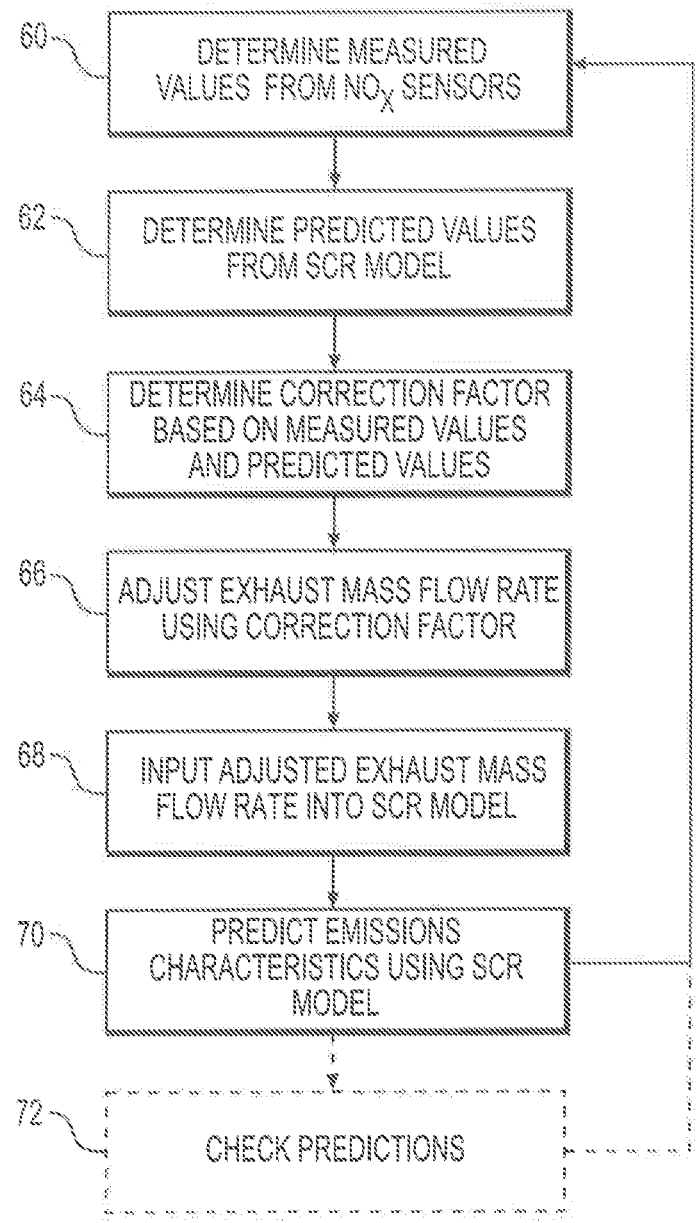
FIG. 3 is a flow chart illustrating an exemplary disclosed method of predicting an emissions characteristic, according to an embodiment.

FIG. 3 shows a flow chart depicting an exemplary embodiment of an algorithm of the software control used in connection with the controller 20 and model 30 shown in FIGS. 1 and 2. The steps described below may be repeated by the controller 20 periodically, e.g., every 0.12 seconds.

The controller 20 may determine the measured values of the NOx sensors 24, 26 (step 60). The controller 20 may also determine a predicted value for the output from the downstream NOx sensor 26 (step 62). The predicted value may be determined using the following Equation (7):

$$NOx'_{P2} = NOx + (0.8 \times NH_3) \quad (7)$$

where $NOx'_{P2}$ is the predicted downstream NOx sensor value, NOx is the outlet NOx concentration 46 determined from the model 30, and $NH_3$ is the outlet ammonia concentration 48 determined from the model 30. The factor of 0.8 is dependent on the configuration of the downstream NOx sensor 26 and may vary depending on the downstream NOx sensor 26.

The controller 20 may then determine the correction factor 50 based on the measured values determined in step 60 and the predicted downstream NOx sensor value determined in step 62 (step 64). In an embodiment, the correction factor 50 may be calculated using the following Equation (8):

$$\text{Correction Factor} = \ln(1-\eta_1)/\ln(1-\eta_2) \quad (8)$$

where ln is the natural log function, $\eta_1$ is a conversion efficiency of the SCR catalyst 16 calculated using the measured values from the NOx sensors 24, 26, and $\eta_2$ is a conversion efficiency of the SCR catalyst 16 calculated using the predicted downstream NOx sensor value. In an embodiment, $\eta_1$ and $\eta_2$ may be determined using the following Equations (9) and (10):

$$\eta_1 = (NOx'_{M1} - NOx'_{M2})/NOx'_{M1} \quad (9)$$

$$\eta_2 = (NOx'_{M1} - NOx'_{P2})/NOx'_{M1} \quad (10)$$

where $NOx'_{M1}$ is the measured value from the upstream NOx sensor 24, $NOx'_{M2}$ is the measured value from the downstream NOx sensor 26, and $NOx'_{P2}$ is the predicted downstream NOx sensor value determined using Equation (7). $NOx'_{M1}$ may be used in Equation (10), instead of a predicted upstream NOx sensor value, based on the assumption that there is a negligible (if any) amount of ammonia at the location of the upstream NOx sensor 24.

The correction factor calculated using Equations (8)-(10) may equal approximately 1 when the predicted downstream NOx sensor value is approximately equal to the measured value. The correction factor may be less than 1 when the predicted downstream NOx sensor value is greater than the measured value. The correction factor may be greater than 1 when the predicted downstream NOx sensor value is less than the measured value.

The controller 20 may adjust the exhaust mass flow rate 34 using the correction factor 50 (step 66). In an embodiment, the exhaust mass flow rate 34 may be multiplied by the correction factor 50. Thus, if the correction factor is approximately 1 (the predicted downstream NOx sensor value is approximately equal to the measured value), then the exhaust mass flow rate 34 stays approximately the same. If the correction factor is less than 1 (the predicted downstream NOx sensor value is greater than the measured value), then the exhaust mass flow rate 34 is decreased. If the correction factor is greater than 1 (the predicted downstream NOx sensor value is less than the measured value), then the exhaust mass flow rate 34 is increased.

The controller 20 may input the adjusted exhaust mass flow rate 34 into the model 30 (step 68) and may determine the outlet NOx concentration 46 and the outlet ammonia concentration 48 using the model 30 with the adjusted exhaust mass flow rate 34 (step 70). Thus, using the adjusted exhaust mass flow rate 34 when there is tin error between the predicted and measured values for the downstream NOx sensor 26 may have the effect of speeding up or slowing down the kinetics of the model 30.

The implementation of the correction factor may be understood using the relationship between the calculated correction factor 50, and the kinetic rate and space velocity of the model 30, which is shown in the following Equation (11):

$$\text{Correction Factor} = (k_1 SV_2)/(k_2 SV_1) \quad (11)$$

where $k_1$ is an actual global kinetic rate of the SCR catalyst 16; $k_2$ is a global kinetic rate associated with the model 30; $SV_1$ is an actual space velocity of the SCR catalyst 16; and $SV_2$ is art effective space velocity of the model 30, which depends on the physical dimensions of the catalyst 16 and the exhaust mass flow rate 34. Changing the kinetic rate $(k_2)$ associated with the model 30 using the correction factor may be difficult since it may involve changing the pre-exponential factors in Equations (1)-(6). In the embodiment described above, the exhaust mass flow rate is changed using the correction factor, which also changes the effective space velocity $(SV_2)$ of the model 30 and produces the same effect as changing the kinetics $(k_2)$ associated with the model 30. The space velocity of the model 30 is relatively simple to change because it involves either changing the catalyst dimension, e.g., the length or diameter of the SCR catalyst 16 used in the model 30 or changing the exhaust mass flow rate 34, as described above. Alternatively, the correction factor may be used to adjust the length or diameter of the SCR catalyst 16 used in the model 30.

Optionally, the controller 20 may also check the calculations of the outlet NOx concentration 46 and the outlet ammonia concentration 48 (step 72). In an embodiment, the controller 20 may calculate the outlet NOx and ammonia concentrations using the following Equations (12) and (13):

$$NH_{3,P2} = (NOx'_{M2} + NH_{3,inj} - NOx'_{M1})/1.8 \quad (12)$$

$$NOx_{P2} = NOx'_{M2} - (0.8 \times NH_{3,P2}) \quad (13)$$

where $NOx_{P2}$ is the outlet NOx concentration, $NH_{3,P2}$ is the outlet ammonia concentration, $NOx'_{M1}$ is the measured value from the upstream NOx sensor 24, $NOx'_{M2}$ is the measured value from the downstream NOx sensor 26, and $NH_{3,inj}$ is the inlet ammonia concentration 40. Equations (12) and (13) apply when the engine 10 is running in steady-state operation and do not account for oxidation of ammonia over the SCR catalyst 16 by oxygen in the flow of exhaust, which may occur at temperatures greater than 450 degrees Celsius, depending on the composition of the SCR catalyst 16. Therefore, this check may apply only during steady-state conditions and relatively lower temperatures.

During steady-state conditions and relatively lower temperatures, the controller 20 may calculate the outlet NOx and ammonia concentrations using Equations (12) and (13) and may compare the calculated values to the values determined in step 70 above. If the values determined in step 70 are outside a certain threshold of the values calculated using Equations (12) and (13) (e.g., within 10 or 20% of the values calculated using Equations (12) and (13)), then the controller 20 may notify an operator of an error. For example, there may be an error in the model 30 or in the calculation of the correction factor 50. Otherwise, if the values are within the acceptable threshold, then the controller 20 may return to step 60.

The flow chart described above in connection with FIG. 3 depicts an exemplary embodiment of the algorithm and software control. Those skilled in the art will recognize that similar algorithms and software control may be used without deviating from the scope of the present disclosure.

Several advantages over the prior art may be associated with the exhaust emissions prediction system. The exhaust emissions prediction system may take into account the cross-sensitivity to ammonia of the NOx sensors 24, 26 to adjust the model 30. Therefore, the model 30 may provide more accurate and reliable predictions of outlet NOx and ammonia concentrations downstream of the SCR catalyst 16, even when ammonia slip is occurring.

The exhaust emissions prediction system may be executed in real time, and is not limited to steady-state operating conditions and lower temperatures. By incorporating Equations (1)-(6) into the model 30, the model 30 may predict transient performance of the SCR catalyst 16 more accurately and may also be more accurate in higher temperature operation when there may be significant ammonia oxidation, unlike Equations (12) and (13). Equations (1)-(6) also allow the model 30 to estimate the kinetics of the reactions taking place in the SCR catalyst 16. The model 30 may also omit other reactions and limitations within the SCR catalyst 16 in order to be able to be executed in real time without sacrificing the relative accuracy of the estimates of the operating characteristics of the SCR catalyst 16. The model 30 may respond in real time to changes in the exhaust system 12, temporary deactivation or long term aging of the SCR catalyst 16, or even minor errors in the model 30, such as errors in dimensions of the SCR catalyst 16 input into the model 30.

The model 30 may help reduce the reliance on maps and look-up tables when predicting the performance of the SCR catalyst 16, which may make the controller 20 simpler to calibrate and implement for different engine platforms. The model 30 can also be used to help the controller 20 anticipate and mitigate the release of NOx downstream of the SCR catalyst 16 or ammonia slip events.

It will be apparent to those skilled in the art that various modifications and variations can be made to the exhaust emissions prediction system. Other embodiments will be apparent to those skilled in the art from consideration of the specification and practice of the disclosed exhaust emissions prediction system. It is intended that the specification and examples be considered as exemplary only, with a true scope being indicated by the following claims and their equivalents.

What is claimed is:

1. An exhaust emissions prediction system comprising:
a catalytic device configured to receive a flow of exhaust;
a downstream NOx sensor located downstream of the catalytic device, the downstream NOx sensor being sensitive to NOx and ammonia, and being configured to generate a measured value;
a controller configured to:
receive the measured value from the downstream NOx sensor,
determine a mass flow rate of the flow of exhaust into the catalytic device,
determine a predicted value at the downstream NOx sensor based on the mass flow rate,
determine an adjusted mass flow rate by scaling the mass flow rate based on the predicted value and the measured value, and
estimate the predicted value downstream of the catalytic device based on the adjusted mass flow rate.

2. The exhaust emissions prediction system of claim 1, further comprising:
an upstream NOx sensor located upstream of the catalytic device, the upstream NOx sensor being sensitive to NOx and ammonia, and configured to output a measured value;
wherein the controller is connected to the upstream NOx sensor and configured to determine the adjusted mass flow rate also based on the measured value from the upstream NOx sensor.

3. The exhaust emissions prediction system of claim 2, wherein the controller is further configured to determine a correction factor based on a first conversion efficiency of the catalytic device determined using the measured values output from the upstream and downstream NOx sensors and a second conversion efficiency of the catalytic device determined using the predicted value, and adjust the mass flow rate by multiplying the mass flow rate by the correction factor.

4. The exhaust emissions prediction system of claim 1, wherein, when the predicted value is greater than the measured value, the controller is configured to determine the adjusted mass flow rate by decreasing the mass flow rate.

5. The exhaust emissions prediction system of claim 1, wherein, when the predicted value is less than the measured value, the controller is configured to determine the adjusted mass flow rate by increasing the mass flow rate.

6. The exhaust emissions prediction system of claim 1, wherein the controller is configured to determine at least one emissions characteristic and the predicted value using a physics-based model of the catalytic device, and using the adjusted mass flow rate as an input to the model.

7. The exhaust emissions prediction system of claim 1, wherein the controller is further configured to determine the predicted value by using the physics-based model to determine a concentration of NOx downstream of the catalytic device and a concentration of ammonia downstream of the catalytic device.

8. The exhaust emissions prediction system of claim 6, wherein the controller is configured to further input into the physics-based model at least one of an inlet temperature, an inlet NO concentration, an inlet $NO_2$ concentration, an inlet ammonia concentration, an inlet $O_2$ concentration of the flow of exhaust entering the catalytic device, and an outlet pressure of the flow of exhaust exiting the catalytic device.

9. The exhaust emissions prediction system of claim 1, wherein the at least one emissions characteristic is at least one of NOx or ammonia in the flow of exhaust downstream of the catalytic device.

10. The exhaust emissions prediction system of claim 1, wherein the catalytic device is a selective catalytic reduction device.

11. The exhaust emissions prediction system of claim 1, further comprising an injector disposed upstream from the catalytic device, the injector being configured to inject reductant into the flow of exhaust.

12. A method of predicting an emissions characteristic in a flow of exhaust from an engine using a controller, the method comprising:

using a downstream NOx sensor located downstream of a catalytic device to determine a measured value indicative of a concentration of NOx and ammonia in the flow of exhaust generated by the engine;

determining, using the controller, a mass flow rate of the flow of exhaust into the catalytic device;

determining, using the controller, a predicted value for the concentration of NOx and ammonia in the flow of exhaust at the downstream NOx sensor based on the mass flow rate;

determining, using the controller, an adjusted mass flow rate by scaling the mass flow rate based on the predicted value and the measured value; and estimating, using the controller, the predicted value downstream of the catalytic device using the adjusted mass flow rate.

13. The method of claim 12, further comprising:
determining, using the controller, a correction factor based on the predicted value and the measured value; and
wherein determining the adjusted mass flow rate includes multiplying the mass flow rate by the correction factor.

14. The method of claim 13, wherein determining the correction factor includes determining that the correction factor is approximately one when the predicted value is approximately equal to the measured value.

15. The method of claim 13, wherein determining the correction factor includes:
determining that the correction factor is less than one when the predicted value is greater than the measured value; and
determining that the correction factor is greater than one when the predicted value is less than the measured value.

16. An engine system comprising:
an engine configured to generate a flow of exhaust;
an injector configured to inject reductant into the flow of exhaust;
a catalytic device configured to receive the flow of exhaust after being injected with the reductant;
an upstream NOx sensor located upstream of the catalytic device and being configured to output a measured value;
a downstream NOx sensor located downstream of the catalytic device, the downstream NOx sensor being sensitive to NOx and ammonia, and configured to output a measured value;

a processor;
a memory module configured to store instructions that, when executed, enable the processor to:
determine a mass flow rate of the flow of exhaust into the catalytic device,
determine a predicted value for the downstream NOx sensor based on the mass flow rate,
determine a correction factor based on a first conversion efficiency of the catalytic device determined using the measured values output from the upstream and downstream NOx sensors and a second conversion efficiency of the catalytic device determined using the predicted value,
determine an adjusted mass flow rate by scaling the mass flow rate using the correction factor, and
estimate the predicted value downstream of the catalytic device using the adjusted mass flow rate.

17. The engine system of claim 16, wherein the memory module is further configured to store instructions that, when executed, enable to the processor to determine the at least one emissions characteristic and the predicted value using a physics-based model of the catalytic device, and by adjusting an input into the model using the correction factor.

18. The engine system of claim 17, wherein the input includes at least one of a mass flow rate of the flow of exhaust into the catalytic device, or a dimension of the catalytic device.

19. The engine system of claim 18, wherein:
when the predicted value is greater than the measured value, the controller is configured to decrease the mass flow rate and determine the at least one emissions characteristic based on the decreased mass flow rate; and
when the predicted value is less than the measured value, the controller is configured to increase the mass flow rate and determine the at least one emissions characteristic based on the increased mass flow rate.

20. The engine system of claim 16, wherein determining the correction factor includes:
determining that the correction factor is less than one when the predicted value is greater than the measured value; and
determining that the correction factor is greater than one when the predicted value is less than the measured value.

\* \* \* \* \*